US007709976B2

(12) United States Patent
Bazinet

(10) Patent No.: US 7,709,976 B2
(45) Date of Patent: May 4, 2010

(54) DUAL-INPUT DC-DC CONVERTER WITH INTEGRATED IDEAL DIODE FUNCTION

(75) Inventor: John Phillip Bazinet, Webster, NH (US)

(73) Assignee: Linear Technology Corporation, Milpitas, CA (US)

( * ) Notice: Subject to any disclaimer, the term of this patent is extended or adjusted under 35 U.S.C. 154(b) by 311 days.

(21) Appl. No.: 11/183,969

(22) Filed: Jul. 19, 2005

(65) Prior Publication Data

US 2007/0018502 A1   Jan. 25, 2007

(51) Int. Cl.
*H02J 1/00* (2006.01)
*H02M 3/155* (2006.01)

(52) U.S. Cl. .............................. 307/85; 307/80; 307/82; 307/86; 323/269; 323/272; 323/290; 363/80

(58) Field of Classification Search .................. 307/80, 307/82, 85, 86; 323/268, 269, 271, 272, 323/290, 300; 363/74, 78, 79, 80
See application file for complete search history.

(56) References Cited

U.S. PATENT DOCUMENTS

| | | | |
|---|---|---|---|
| 5,598,041 A * | 1/1997 | Willis ........................... 307/43 |
| 5,895,982 A | 4/1999 | Eng | |
| 6,037,755 A * | 3/2000 | Mao et al. .................... 323/222 |
| 6,566,766 B2 * | 5/2003 | Matsuda et al. ............... 307/82 |
| 7,170,197 B2 * | 1/2007 | Lopata ......................... 307/70 |
| 7,256,568 B2 * | 8/2007 | Lam et al. .................... 323/222 |
| 7,265,524 B2 * | 9/2007 | Jordan et al. ................. 323/225 |
| 2002/0093317 A1 | 7/2002 | Matsuda et al. | |

FOREIGN PATENT DOCUMENTS

DE   41-04-842 A1   8/1992

OTHER PUBLICATIONS

Yat-Hei Lam et al., "Single-inductor dual-input dual-output switching converter for integrated battery charging and power regulation", Circuits and Systems, 2003. ISCAS '03, Proceedings of the 2003 International Symposium, vol. 3, p. 447-450.

* cited by examiner

*Primary Examiner*—Albert W Paladini
*Assistant Examiner*—Hal I Kaplan
(74) *Attorney, Agent, or Firm*—McDermott Will & Emery LLP

(57) ABSTRACT

Novel system for supplying power from multiple power sources to a powered device has first and second input power supplies for respectively providing power from first and second power sources. An input selector circuit is responsive to the first and second input power supplies for producing an input power supply signal provided to a power regulator, such as a DC-DC converter, for generating a regulated output power supply signal. The power regulator includes a first transistor device controlled to support conversion of the input power supply signal into the output power supply signal if the input power supply signal is provided by the first input power supply, and a second transistor device controlled to support conversion of the input power supply signal into the output power supply signal if the input power supply signal is provided by the second input power supply.

21 Claims, 2 Drawing Sheets

DUAL-INPUT DC-DC CONVERTER WITH INTEGRATED IDEAL DIODE FUNCTION

TECHNICAL FIELD

This disclosure relates to power supply systems, and more particularly, to circuitry and methodology for selecting between input power sources for supplying power to an electronic device.

BACKGROUND ART

Most portable electronic devices provide the capability to operate from two or more input power sources. In addition to primary (non-rechargeable) batteries or secondary (rechargeable) batteries, a portable electronic device may use an auxiliary power source such as a wall adapter, supercapacitor, backup battery or Universal Serial Bus (USB) port.

Power from input power sources are supplied to one or more DC-DC converters provided in the portable electronic device to regulate the input voltage to precise bias levels required for microprocessors, miniature hard disk drives, digital circuitry, input/output rails, radio-frequency and audio circuitry, and other circuits. These DC-DC converters require the ability to select the most appropriate input power source in order to maximize their efficiency, prolong battery life and/or minimize heat generation.

In most cases, when a wall adapter or other non-battery power source is plugged into a portable device powered by a rechargeable battery, it supplies power in lieu of the battery to allow the battery to recharge in the shortest possible time. In the case of a portable device powered by a non-rechargeable battery, the auxiliary power source may provide power to retain volatile memory while the non-rechargeable battery is being replaced. When the auxiliary power source is removed, the portable device is powered by the battery.

Hence, a portable electronic device must rely on some input power selecting means that would make the switchover between the battery and the auxiliary power supply seamless. The switchover circuitry needs to insure that the input power sources are never directly connected to each other and that they block reverse current when an input power source is not selected. Also, it would be desirable to provide the switchover circuitry implementing an ideal diode function to avoid reducing system efficiency by placing additional resistances or diode forward voltage drops on the main power path.

Accordingly, there is a need for a circuit for selecting between input power sources that would maximize power efficiency and minimize heat generation to provide longer battery life in portable electronic devices. In addition, it would be desirable to create this circuit using the minimum number of components to improve manufacturability and cost.

SUMMARY OF THE DISCLOSURE

The present disclosure offers novel system and methodology for supplying power to a powered device from multiple power sources. In accordance with one aspect of the disclosure, a power supply system comprises a first input for providing power from a first power source to a load, a second input for providing power from a second power source to the load, an input selector coupled to the first input and the second input to select the first input or the second input, and a regulator having a first transistor device for converting the input signal into a regulated output signal supplied to the load. The input selector controls the first transistor device to be activated if the first input is selected, and has a second transistor device controlled to be activated if the second input is selected.

In accordance with an embodiment of the present disclosure, the first and second transistor devices may be field-effect transistors connected in parallel. The first transistor device may be deactivated if the second input is selected, whereas the second transistor device may be deactivated if the first input is selected.

The input selector circuit may comprise a sensing circuit responsive to the first and second inputs for controlling the first and second transistor devices. Also, the input selector circuit may include first and second driver circuits activated by the sensing circuit for controlling the first and second transistor devices, respectively.

The power regulator may comprise a pulse modulation control circuit for controlling conversion of the input signal into the output signal. The first and second driver circuits may be controlled by the pulse modulation control circuit to drive the first and second transistor devices.

In accordance with another aspect of the disclosure, a power regulator has a first power supply input for supplying power from a first power source, and a second power supply input for supplying power from a second power source. The power regulator includes an input selection circuit that selects between the first power supply input and the second power supply input to produce an input signal, and a power converting circuit that converts the input signal into a regulated output signal. The power converting circuit includes a pulse modulator circuit for controlling conversion of the input signal into the output signal, a first transistor device controllable by the pulse modulator circuit for supporting conversion of the input signal into the output signal if the first power supply input is selected, and a second transistor device controllable by the pulse modulator circuit for supporting conversion of the input signal into the output signal if the second power supply input is selected.

In accordance with a method of the present disclosure, the following steps are carried out to selectively supply power via a power regulator to a powered device from a first power source or from a second power source:

selecting between the first power source and the second power source to provide an input power supply signal to the power regulator having a first transistor switch for converting the input power supply signal into a regulated output power supply signal supplied to the powered device, if the first power source is selected, activating the first transistor switch to supply the input power supply signal, and if the second power source is selected, activating a second transistor switch arranged in parallel with the first transistor switch to supply the input power supply signal.

The method may further include the step of sensing power supply from the first and second power sources to select between the first power source and the second power source.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made with the example of circuitry for selection between a battery and a wall adapter. It will become apparent, however, that the concepts described herein are applicable to selection between any power sources.

Figure 1:
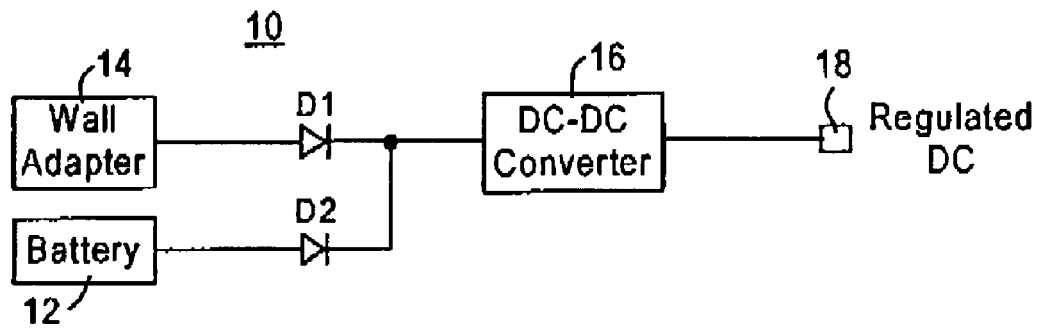
FIG. 1 illustrates a diode circuit for selecting between input power sources.

FIG. 1 shows an input selection circuit 10 that illustrates the concept of selection between various input power sources. The circuit 10 comprises series diodes D1 and D2 connected in a logical OR configuration to provide selection between a battery 12 and a wall adapter 14. When a voltage produced by one of the input power sources is higher than a voltage produced by the other power source by a voltage drop on one of the diodes, power will be taken from the power source with a higher voltage. The input power is supplied to a DC-DC converter 16 that produces a regulated DC signal at its output 18.

The disadvantage of this technique is that the input power path is provided directly through the series diodes. The 0.6V drop of a typical silicon diode will contribute towards a power loss directly proportional to the input current. This loss becomes more significant as the input voltage reduces. The power loss may be reduced if the silicon diodes are replaced with Schottky rectifiers having a voltage drop substantially less that of the silicon diodes.

Figure 2:
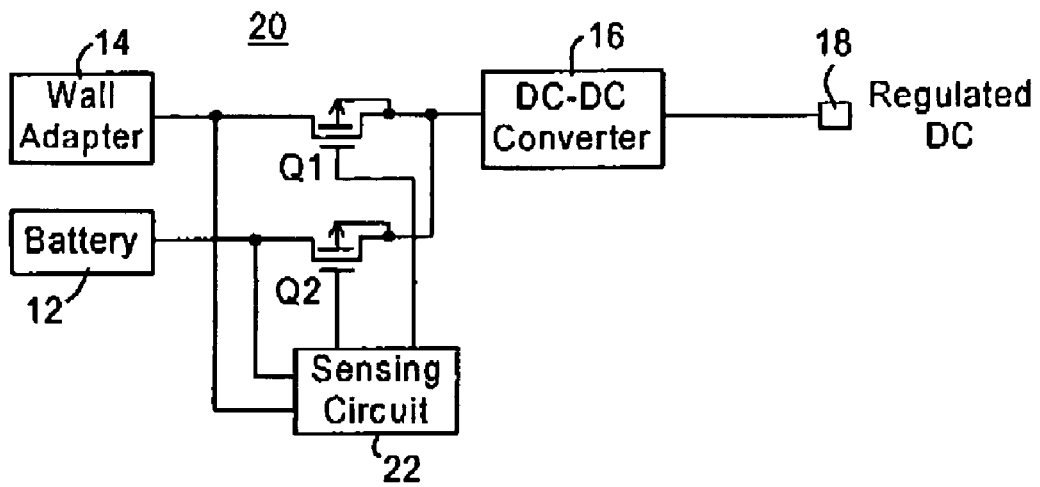
FIG. 2 illustrates a MOSFET circuit for selecting between input power sources.

FIG. 2 illustrates an input power selection circuit 20 improved with respect to the diode circuit 10 shown in FIG. 1. The input power selection circuit 20 contains P-channel MOSFET transistors Q1 and Q2 connected between the input power sources 12, 14 and the DC-DC converter 16. Examples of the input power selection circuit with MOSFET selection channels are the LTC®4411 and LTC®4413 monolithic ideal diodes developed by Linear Technology Corporation, assignee of the present subject matter.

The MOSFET transistors operate in the linear region in order to provide a smaller voltage drop than the diodes. The voltage drop across the MOSFET that connects the respective input power source to the DC-DC converter 16 is proportional to the drain-source on-state resistance Rds(on) of the MOSFET transistor, which may be below 100 mΩ. During normal forward operation, each MOSFET channel may provide a forward voltage drop that is proportional to the current.

A sensing circuit 22 senses both of the input voltage sources to turn on the MOSFET connected to the input power source having a higher voltage. At the same time, the other MOSFET is driven to the off state to prevent reverse conduction. While the MOSFET-based circuit 20 provides an improvement over the diode-based circuit 10, it still places additional resistance in the power path causing power loss that increases with the square of current. As a result, the efficiency of the system is reduced shortening battery life. Moreover, additional circuits are required to sense and compare input voltages, and drive the external MOSFETs to the appropriate states.

Figure 3:
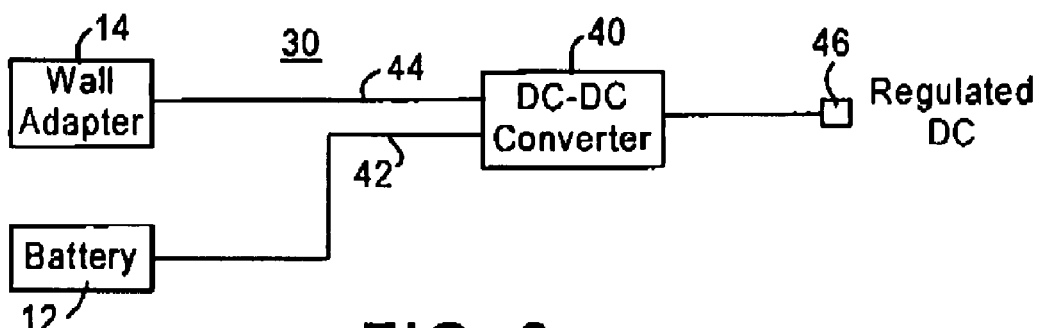
FIG. 3 shows a dual-input DC-DC converter.

FIG. 3 illustrates a dual-input regulating system 30 that further improves efficiency prolonging battery life. The regulating system 30 includes a DC/DC converter 40 having two inputs 42 and 44 connected to respective input power sources such as a battery 12 and a wall adapter 14, and an output 46 for producing a regulated DC output voltage. Although the present disclosure will be made with the example of the DC/DC converter 40 operating as a buck-boost regulator, one skilled in the art would realized that the concepts described herein are also applicable to a buck regulator.

The DC/DC converter 40 may be arranged in a switching regulator integrated circuit (IC). No external input power selection circuitry is provided outside of the DC/DC converter 40. Moreover, as described in more detail later, circuitry for selecting between the input power source 12 and the input power source 14 utilizes some of the components present in the DC/DC converter 40 for performing a power regulation function. This significantly improves efficiency. At the same time, less heat is generated further improving efficiency and reliability.

Figure 4:
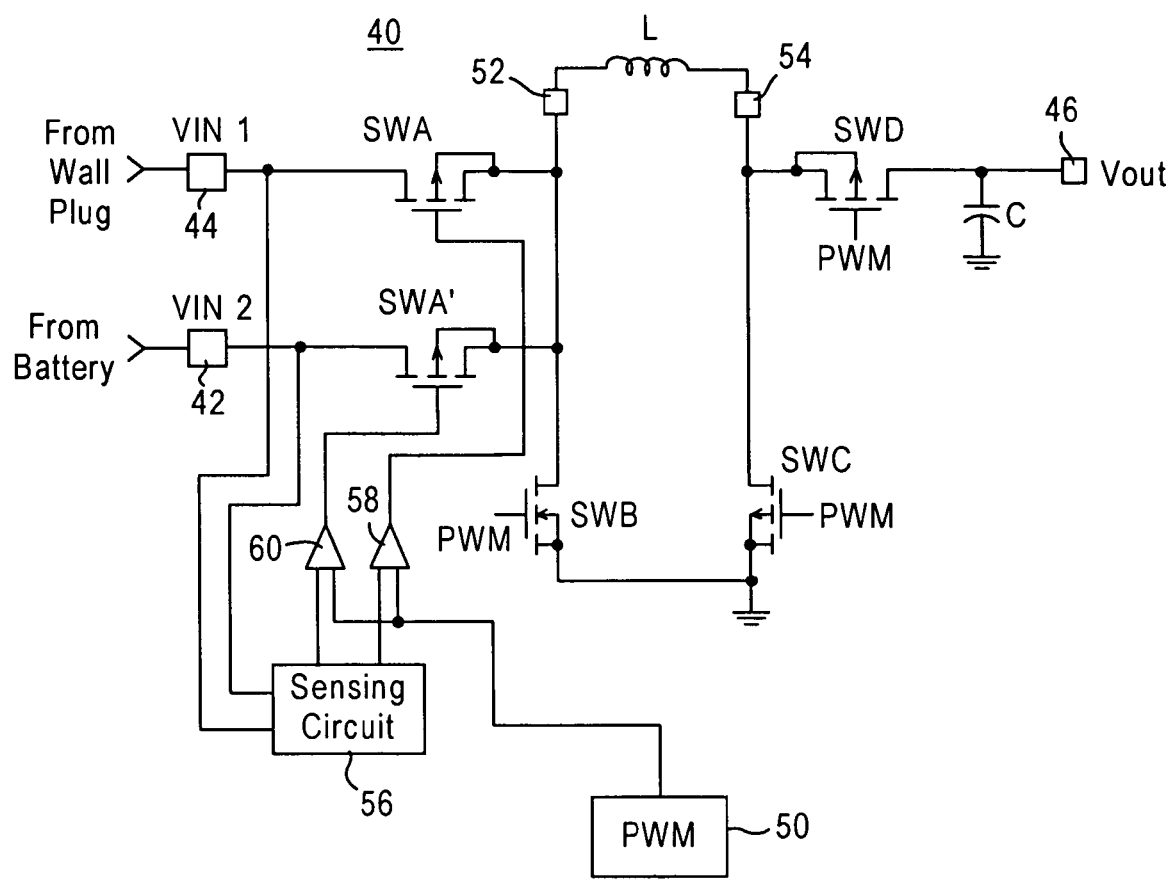
FIG. 4 illustrates a simplified arrangement of the converter shown in FIG. 3.

FIG. 4 shows a simplified arrangement of an exemplary DC/DC converter 40 that comprises a single inductor L, and MOSFET switches SWA, SWB, SWC and SWD controlled by a pulse-width modulation (PWM) control circuit 50 to produce a regulated DC voltage Vout at the output 46 in response to an input voltage Vin. The inductor L may be connected between terminals 52 and 54. An output capacitor C is coupled to the output terminal Vout. Such an arrangement supports buck-boost power regulation to generate a regulated output voltage Vout when the input voltage Vin is either higher or lower than Vout.

In particular, if the input voltage Vin is higher than the output voltage Vout, the DC/DC converter 40 operates in a buck mode. In this mode, assuming that only input voltage Vin1 from a single input voltage source is present, MOSFET switches SWA and SWB are alternately switched by the PWM control circuit 50 at a duty cycle $D_{buck}$ required to regulate the output voltage Vout in the buck mode. When switch SWA is on, switch SWB is off. Similarly, when switch SWA is off, switch SWB is on. In the buck mode, switch SWC is always turned off, and switch SWD is always turned on.

If the input voltage Vin is less than Vout, the DC/DC converter 40 operates in a boost mode. In this mode, assuming that only input voltage Vin1 from a single input voltage source is present, switch SWA is always on, switch SWB is always off, and switches SWC and SWD are alternately switched by the PWM control circuit 50 at a duty cycle $D_{boost}$ selected to regulate the output voltage Vout in the boost mode.

If the input voltage Vin is near the output voltage Vout, the DC/DC converter 40 operates in a buck-boost mode to achieve a smooth transition between the buck and boost modes. In the buck-boost mode, the switches SWA and SWB are alternately switched by the PWM control circuit 50 at a duty cycle $D_{buck}$, and the switches SWC and SWD are alternately switched by the PWM control circuit at a duty cycle $D_{boost}$. The duty cycles $D_{buck}$ and $D_{boost}$ are controlled to allow the buck mode to phase out and the boost mode to phase in gradually as the input voltage Vin decreases, or to achieve a gradual transition from the boost mode to the buck mode as the input voltage Vin increases.

Alternatively, the DC/DC converter 40 of the present disclosure may be implemented as a synchronous buck regulator. In this case, it contains only MOSFET switches SWA and SWB.

In addition to the power regulating function discussed above, the DC/DC converter 40 of the present disclosure provides selection between multiple input power sources such as a battery 12 and a wall adapter 14. In particular, the DC/DC converter 40 contains an additional MOSFET switch SWA' for supporting power supply from a second power source. For example, the MOSFET switch SWA typically provided in a regular DC/DC converter for performing power regulation may have one electrode connected to the inductor L and another electrode connected to the input 44 that supplies input voltage Vin1 from the wall adapter 14. The additional MOSFET switch SWA' may be connected in parallel to the switch SWA. One electrode of the MOSFET switch SWA' may be connected to the inductor L and another electrode may be connected to the input 42 that supplies input voltage Vin2 from the battery 12.

Also, the DC/DC converter 40 comprises a sensing circuit 56 connected to the power supply inputs 42 and 44 for determining which of the power supply inputs 42 and 44 provides higher input voltage in the vast majority of implementations. Alternatively, one of the inputs may be given priority such that it will always be activated if the voltage applied to it exceeds a programmed level. Output signals of the sensing circuit 56 are supplied to drivers 58 and 60 controlled by the PWM control circuit 50 for driving gates of the MOSFET switches SWA and SWA', respectively.

If the input voltage Vin1 from the wall adapter 14 is lower than the input voltage Vin2 from the battery 12, the sensing circuit 56 controls the driver 58 to deactivate switching of the SWA and controls the driver 60 to activate switching of the additional MOSFET switch SWA' that operates instead of the switch SWA. However, if the input voltage Vin2 from the battery 12 is lower than the input voltage Vin1 from the wall adapter 14, the sensing circuit 56 controls the driver 60 to deactivate switching of the additional MOSFET switch SWA' and controls the driver 58 to activate switching of the MOSFET switch SWA. Hence, the sensing circuit 56 deactivates one of the MOSFET switches SWA and SWA' and activates the other MOSFET switch when the respective input voltage is lower than the other input voltage.

Accordingly, if the input voltage Vin2 is lower than the input voltage Vin1, the MOSFET switch SWA is controlled by the PWM control circuit 50 to participate in a power regulating procedure in a manner described above to produce a regulated output voltage Vout in response to the input voltage Vin1. However, if the input voltage Vin1 is lower than the input voltage Vin2, the additional MOSFET switch SWA' is activated instead of the switch SWA to participate in the power regulating procedure to generate a regulated output voltage Vout in response to the input voltage Vin2.

As the MOSFET switch SWA is already present in a DC/DC controller for performing a power regulating function, the input power selection function of the present disclosure requires only one additional MOSFET transistor. Moreover, the additional MOSFET transistor SWA' is connected in parallel to the transistor SWA and operates alternately with this transistor. Therefore, no additional resistance is introduced into the power path. As a result, power efficiency of the input power selection circuitry is improved increasing the battery life. At the same time, less heat is generated further improving efficiency and reliability.

The additional MOSFET transistor SWA', sensing circuit 56, and the drivers 58 and 60 may be integrated within a switching regulator integrated circuit, together with the MOSFET switches SWA, SWB, SWC and SWD. Therefore, the external circuitry is completely eliminated, greatly reducing the circuit complexity.

Switches SWA and SWA' may be implemented using P-channel MOSFET transistors. Alternatively, N-channel MOSFET switches or bipolar transistor switches may be utilized.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A power supply system comprising:
    a first input for providing power from a first power source to a load,
    a second input for providing power from a second power source to the load,
    an input selector circuit coupled to the first input and the second input to select the first input or the second input, and
    a power regulator configured for operating in a buck-boost mode and having a single inductor device and a first transistor device for converting an input signal into a regulated output signal supplied to the load,
    the input selector circuit controlling the first transistor device to be activated if the first input is selected, and having a second transistor device controlled to be activated if the second input is selected,
    the first input being electrically connected directly to the first transistor device,
    the second input being electrically connected directly to the second transistor device, and
    the first and second transistor devices being electrically connected to the single inductor device.

2. The system of claim 1, wherein the second transistor device is connected in parallel to the first transistor device.

3. The system of claim 1, wherein the first transistor device is deactivated if the second input is selected, and the second transistor device is deactivated if the first input is selected.

4. The system of claim 1, wherein the input selector circuit comprises a sensing circuit responsive to the first and second inputs for controlling the first and second transistor devices.

5. The system of claim 4, wherein the input selector circuit further includes first and second driver circuits activated by the sensing circuit for controlling the first and second transistor devices, respectively.

6. The system of claim 5, wherein the power regulator comprises a pulse width or frequency modulation control circuit for controlling conversion of the input signal into the output signal.

7. The system of claim 6, wherein the first and second driver circuits are controllable by the pulse width or frequency modulation control circuit to drive the first and second transistor devices.

8. The system of claim 1, wherein the first and second transistor devices are field-effect or bipolar transistors.

9. The system of claim 1, wherein the power regulator is configured for providing DC-to-DC conversion.

10. The system of claim 1, wherein the input selector circuit is configured for selecting between supplying power from a battery and supplying power from an auxiliary power source.

11. A power regulator comprising:
a first power supply input for supplying power from a first power source,
a second power supply input for supplying power from a second power source,
a power converting circuit configured to operate in a buck-boost mode for converting an input signal into a regulated output signal, and
an input selection circuit for selecting between the first power supply input and the second power supply input to produce the input signal,
the power converting circuit including:
a pulse modulator circuit for controlling conversion of the input signal into the output signal,
a first transistor device controllable by the pulse modulator circuit for supporting conversion of the input signal into the output signal if the first power supply input is selected,
a second transistor device controllable by the pulse modulator circuit for supporting conversion of the input signal into the output signal if the second power supply input is selected, and
a single inductor device electrically connected to the first and second transistor devices,
the first power supply input being electrically connected directly to the first transistor device, and
the second power supply input being electrically connected directly to the second transistor device.

12. The power regulator of claim 11, wherein the second transistor device is connected in parallel to the first transistor device.

13. The power regulator of claim 11, wherein the first transistor device includes a first MOSFET transistor, and the second transistor device includes a second MOSFET transistor.

14. The power regulator of claim 11, wherein the pulse modulator circuit includes a pulse width or pulse frequency modulator.

15. The power regulator of claim 11, wherein the input selector circuit comprises a sensing circuit responsive to the first and second power supply inputs for selectively activating control of the first transistor device or control of the second transistor device.

16. The power regulator of claim 15, wherein the input selector circuit further includes first and second driver circuits selectively activated by the sensing circuit for driving the first and second transistor devices, respectively.

17. The power regulator of claim 11, wherein the power converting circuit is configured for providing DC-to-DC conversion.

18. The power regulator of claim 11, wherein the input selection circuit is arranged together with the power converting circuit within an integrated circuit.

19. A method of selectively supplying power via a power regulator configured for operating in a buck-boost mode and having a single inductor device to a powered device from a first power source or from a second power source, comprising the steps of:
selecting between the first power source and the second power source to provide an input power supply signal to the power regulator having a first transistor switch for converting the input power supply signal into a regulated output power supply signal supplied to the powered device,
if the first power source is selected, activating the first transistor switch to supply the input power supply signal, and
if the second power source is selected, activating a second transistor switch arranged in parallel with the first transistor switch to supply the input power supply signal, wherein
the first and second transistor switches are electrically connected to the single inductor device, and
the input power supply signal from the first and second power sources is directly supplied to the first and second transistor switches, respectively.

20. The method of claim 19, further comprising the step of sensing power supply from the first and second power sources to select between the first power source and the second power source.

21. A power supply system comprising:
a first input for providing power from a first power source to a load,
a second input for providing power from a second power source to the load,
an input selector circuit coupled to the first input and the second input to select the first input or the second input, and
a power regulator configured for operating in a boost mode and having a single inductor device and a first transistor device for converting an input signal into a regulated output signal supplied to the load,
the input selector circuit controlling the first transistor device to be activated if the first input is selected, and having a second transistor device controlled to be activated if the second input is selected,
the first input being electrically connected directly to the first transistor device,
the second input being electrically connected directly to the second transistor device, and
the first and second transistor devices being electrically connected to the single inductor device.

* * * * *